US006686074B2

(12) United States Patent
Muth et al.

(10) Patent No.: US 6,686,074 B2
(45) Date of Patent: Feb. 3, 2004

(54) SECURED DOCUMENTS IDENTIFIED WITH ANTI-STOKES FLUORESCENT COMPOSITIONS

(75) Inventors: Oliver Muth, Berlin (DE); Helge Brockmann, Boll (DE); Wolfgang Schmidt, Berlin (DE); Anett Bailleu, Berlin (DE); Gabriele Brauer, Berlin (DE); Manfred Paeschke, Basdorf (DE); Benedikt Ahlers, Berlin (DE); Arnim Franz-Burholz, Falkensee (DE); Hans Zerbel, Berlin (DE)

(73) Assignee: Bundesdruckerei GmbH, Berlin (DE)

( * ) Notice: Subject to any disclaimer, the term of this patent is extended or adjusted under 35 U.S.C. 154(b) by 0 days.

(21) Appl. No.: 10/101,520

(22) Filed: Mar. 18, 2002

(65) Prior Publication Data

US 2002/0130303 A1 Sep. 19, 2002

(30) Foreign Application Priority Data

Mar. 16, 2001 (DE) ......................... 101 13 266

(51) Int. Cl.⁷ ............................... B41M 3/12
(52) U.S. Cl. ................. 428/914; 428/399; 428/389; 428/457; 428/916; 252/301.4 R; 235/491
(58) Field of Search ............... 250/423 R, 492.1, 250/458.1, 443.1, 483.1; 252/301.4 S; 235/491; 428/399, 457, 389, 381, 209, 916

(56) References Cited

U.S. PATENT DOCUMENTS

| | | | | |
|---|---|---|---|---|
| 5,560,867 A | * | 10/1996 | Grabmaier et al. ... | 252/301.4 S |
| 5,609,793 A | * | 3/1997 | Yokota et al. ........ | 252/301.4 S |
| 5,844,361 A | * | 12/1998 | Petersen et al. ............ | 313/495 |
| 5,944,927 A | * | 8/1999 | Seifert ........................ | 156/153 |
| 6,137,216 A | * | 10/2000 | Yang .......................... | 313/486 |
| 6,139,065 A | * | 10/2000 | Washburn et al. ............ | 283/67 |
| 6,210,777 B1 | * | 4/2001 | Vermeulen et al. ......... | 428/195 |
| 6,255,948 B1 | * | 7/2001 | Wolpert et al. .......... | 340/572.8 |
| 6,506,476 B1 | * | 1/2003 | Kaule et al. ................ | 428/195 |

FOREIGN PATENT DOCUMENTS

DE    WO 9839392    * 11/1998

* cited by examiner

*Primary Examiner*—Merrick Dixon
(74) *Attorney, Agent, or Firm*—Darby & Darby

(57) ABSTRACT

The present invention provides a secured document including a composition capable of anti-Stokes fluorescence containing an ion capable of absorption of electromagnetic radiation, an ion capable of emitting electromagnetic radiation, and a matrix composition comprising gadolinium, yttrium, lanthanum, and thulium, wherein the wavelength of the absorbed electromagnetic radiation is shorter than the wavelength of the emitted of the absorbed electromagnetic radiation, and wherein the concentrations of the absorbing and emitting ions are adjusted to achieve concentration quenching of anti-Stokes luminescence.

15 Claims, No Drawings

SECURED DOCUMENTS IDENTIFIED WITH ANTI-STOKES FLUORESCENT COMPOSITIONS

CROSS-REFERENCE TO RELATED APPLICATIONS

Reference is made to German patent application numbers 101 13 267.0 and 101 13 268.9, which were filed on Mar. 16, 2001. Reference is also made to U.S. application Ser. Nos. 10/101,524 and 10/099,472 (Attorney Docket Nos. 4077/0K319 and 4077/0K315), filed Mar. 18, 2002 and Mar. 15, 2002 respectively. These applications are incorporated herein by reference.

FIELD OF THE INVENTION

The present invention provides a secured document identified by an authenticating element comprising a composition capable of anti-Stokes fluorescence that includes (a) an ion capable of absorbing electromagnetic radiation, and (b) an ion capable of emitting electromagnetic radiation, wherein the wavelength of the emitted electromagnetic radiation is shorter than the wavelength of the absorbed electromagnetic radiation, and the concentrations of components (a) and (b) are adjusted to achieve concentration quenching.

BACKGROUND OF THE INVENTION

When a phosphor or other luminescent material emits light, in general, it emits light according to Stokes' Law, which provides that the wavelength of the fluorescent or emitted light is always greater than the wavelength of the exciting radiation. While Stokes' Law holds for the majority of cases, it does not hold in certain instances. For example, in some cases, the wavelength is the same for both the absorbed and the emitted radiation. That is, the efficiency appears to be perfect or unity. This is known as resonance radiation.

In other cases, Stokes' Law does not hold where the energy emitted is greater than the energy absorbed. This is known as anti-Stokes emission. This may be due, at least in part, to the fact that at the time a photon is absorbed by a molecule, a collision with one or more other molecules adds extra energy to the absorbing molecule. Consequently, the absorbing molecule receives excess energy over and above what it received from absorbing the photon, and it is promoted to a higher excited state than it would have been promoted to from the original absorption event alone. The molecule is then free to decay from this super-excited state and emit a more energetic photon than it originally absorbed. Anti-Stokes materials typically absorb infrared radiation in the range of about 700 to about 1300 nm, and emit in the visible spectrum.

The use of anti-Stokes luminophores was first mentioned in 1974 by Malmberg et al., in Swedish patent application nos. 7705938-4 and 7413480-0, which correspond to German Patent No. 2,547,768. Further, Bratchley et al., British Patent Nos. 2,258,659 and 2,258,660, proposed oxysulfide anti-Stokes luminophores are materials that could be used to code security documents. However, Malmberg and Bratchley only suggest using $Y_2O_2S$ as a basic lattice material.

Muller et al., WO 00/60527, proposed anti-Stokes luminophore oxysulfide compositions that are stimulated with a pulsed 980 nm laser in order to increase the reliability of detection. Muller also suggested that the excitation conditions should be such that Class I lasers (which have an output power less than 1 mW and are therefore, not harmful to the human eye) can be used. This can be achieved by accurately matching the pulse frequency and the pulse interval to the build-up characteristics of the luminophore used. The laser parameters are adjusted so that the resulting luminescence intensities are at least 50%–90% of the saturation intensity, i.e., the intensity at the steady state laser excitation, of the respective fluorescent substance. Muller suggests $Y_2O_2S$:Yb, Er, $Y_2O_2S$:Yb, Tm and $Gd_2O_2S$:Yb, Er are suitable luminophores.

There are innumerable different types of documents and things which are subject to counterfeiting or forgery, and many different techniques and devices have been developed for determining the authenticity of a document or a thing. By way of example only, documents which are particularly in need of authentication include bank notes, identification papers, passports, packagings, labels and stickers, driver's licenses, admission tickets and other tickets, tax stamps, pawn stamps, and stock certificates. As used herein, the term "secured document" includes any document or thing which is provided with a distinguishing device (whether printed or not) which can be used to authenticate, identify or classify the document.

Furthermore, in addition to determining the authenticity of a secured document, it is sometimes useful to also determine the nominal value of the document or the nature of the document. For example, in a postal system, it is not only necessary to establish the authenticity of the postal stamps and/or release stamps, it may also be beneficial to determine the value of the postage stamps as they are passed through a postal sorting machine.

Accordingly, as used herein, the term "authentication element" is intended to refer to any "device" which may be printed on, or otherwise attached to, a secured document for the purpose of authenticating the document or for the purpose of determining its value and/or type or any other characteristic. Likewise "authenticity" is meant to encompass value, type or other characteristic of a secured document, as well as the genuineness of a document or thing.

It is known to provide secured documents such as bank notes with an authentication element in the form of a distinctive luminescent ink which, when excited by a light of a predetermined wavelength, will emit a distinctive low intensity radiation that can be detected and analyzed as a means for authenticating a secured document. German Patent No. DE 411 7911 A1 discloses such a system which includes a conically expanding fiber optical waveguide and an optical processing system. The radiation from the object to be tested can be collected over a large spatial angle with the narrow cross-sectional end of the fiber optical waveguide. Because of the cross sectional transformation, the radiation emerges from the fiber at a significantly smaller angle, which is coordinated with the cone angle of the optical processing system.

With such a system it is possible to detect relatively low intensity distinguishing luminescent authenticity elements. However, the magnitude of the distinguishing luminescent elements must exceed a certain threshold. The system is therefore still relatively insensitive. Because of the use of a conical fiber, there is also the disadvantage that only a small region of the document can be monitored and checked. Moreover, the system may fail if the authenticity element is disposed at certain places in the document. Further, documents such as postage stamps cannot be identified with this arrangement at the high speeds customary in sorting, distributing and/or counting machines. In the case of laser excitation, characteristic pulse responses, which are of decisive importance for identifying authenticity, also may not be recognized and evaluated.

SUMMARY OF THE INVENTION

The present invention provides a secured document comprising a composition capable of anti-Stokes fluorescence comprising (a) an ion capable of absorption of electromagnetic radiation, (b) an ion capable of emitting electromagnetic radiation, and (c) a matrix composition comprising gadolinium, yttrium, lanthanum, and thulium.

wherein the wavelength of the emitted electromagnetic radiation is shorter than the wavelength of the absorbed electromagnetic radiation, and wherein the concentrations of (a) and (b) are adjusted to achieve concentration quenching of anti-Stokes luminescence.

In a preferred embodiment, the secured document includes a composition comprising a gadolinium oxysulfide selected from the group consisting of (a) a composition of the formula $(Gd_{(1-x-y)}Yb_xTm_y)_2O_2S$; and (b) a composition of the formula $(Gd_{(1-x-y)})_2O_2S:Yb_xTm_y$, wherein x and y are numbers greater than 0, Yb is the ion capable of absorption and Tm is the ion capable of emission. Preferably, the composition has the formula $(Gd_{(1-x-y)})_2$ $O_2S:Yb_xTm_y$, wherein x is $0.05 \leq x \leq 0.80$ and y is $0.0001 y \leq 0.10$, and optimally x is $0.20 \leq x \leq 0.60$ and y is $0.0001 \leq 0.05$, and the composition provides a read-out speed of up to 10 m/s, and preferably between about 3 and about 6 m/s.

The present invention also provides a secured document wherein the composition described above is incorporated into an authentication element comprising a printing ink or pigment. Preferably, the authentication element has a particle size less than 5 μm, more preferably, the particle size is less than 3 μm, and optimally, the particle size is less than 2 μm.

The authentication elements of the invention are applied to secured documents by a method selected from the group consisting of offset printing, half-tone intaglio printing, die stamping gravure printing, and digital printing. Preferably, the authentication element further comprises a printing ink or pigment and a degree of filling is within the range of 1 to 30 percent by weight, more preferably the degree of filling is in the range of 1 to 20 percent by weight, and optimally, the degree of filling is in the range of 5 to 10 percent by weight The invention further provides a secured document having an authentication element applied by a method selected from the group consisting of brushing, coating, and surface-coating, and optionally the authentication element further comprises an adhesive element and it is applied as an adhesive coating to the document.

DETAILED DESCRIPTION OF THE INVENTION

The secured documents of the invention include compositions consisting of anti-Stokes fluorescent materials which are thulium-activated and ytterbium co-doped gadolinium oxysulfides having a formula selected from $(Gd_{(1-x-y)}Yb_xTm_y)_2O_2S$ or $(Gd_{(1-x-y)})_2O_2S:Yb_xTm_{y[I.I]}$, wherein x and y are numbers greater than 0, Yb is the ion capable of absorption and Tm is the ion capable of emission.

In a preferred embodiment, the composition has the formula $(Gd_{(1-x-y)})_2O_2S:Yb_xTm_y$, wherein x is $0.05 \leq x \leq 0.80$ and y is $0.0001 \leq y \leq 0.10$, and more preferably x is $0.20 \leq x \leq 0.60$ and y is $0.0001 \leq y \leq 0.05$, and the composition provides a read-out speed of between about 3 and about 6 m/s.

Alternatively, the composition may employ yttrium, lanthanum, and/or thulium as components of the basic lattice or matrix. In such alternative compositions, yttrium functions as an absorber of infrared excitation radiation and Tm as an emitter of the visible or invisible luminescence radiation.

Further, the compositions described above achieve concentration quenching of the anti-Stokes luminescence, i.e., a portion of the emitted radiation is quenched by the Yb and Tm ions and the amount that is quenched is determined by the concentration of these ions in the composition. As a result, a short decay time of the emission radiation is achieved.

Such compositions are capable of converting comparatively low-energy infrared (IR) excitation radiation into high-energy radiation (anti-Stokes luminescence). The radiation emitted can be in the visible as well as in the invisible range. The relative intensity of the radiation emitted by the compositions of the invention may be adjusted by adjusting the relative concentration of absorbing and emitting ions in the composition. For example, one may adjust the composition by increasing or decreasing the concentration of yttrium and/or thulium in order to enhance the intensity of the radiation emitted from the composition.

The increase (or "build-up") and decrease (or "decay") characteristics, i.e., the increase time or rate and decrease time or rate of the emitted electromagnetic radiation, of anti-Stokes fluorescent materials largely determine the reliability of detection and the possible read-out speed of a luminescing material. For example, if the increase and decrease times are too long, the detector will not get a signal above a certain threshold value in a short time and rapid detection is not possible. The increase characteristics of the compositions can be characterized, for example, by the time required to reach 90 percent of the saturation intensity, or by the so-called, build-up constant (which is defined as the time required to reach $1/e^{th}$ of the steady state luminescence intensity). The intensity profile of the emitted radiation is determined in a specified wavelength range over a predetermined measuring time interval after excitation. The intensity profile is then analyzed in a number of different ways to determine the authenticity of the secured document. In this regard, reference is made to U.S. application Ser. No. 10/099,472 (Attorney Docket No. 407710K315), filed Mar. 15, 2002, the text of which is incorporated herein by reference in its entirety.

Without wishing to be bound by any particular theory, it has been found that, in comparison to photoluminophores or cathodoluminophores, anti-Stokes fluorescent substances, in general, have a relatively slow build-up, which may extend up to a few hundred microseconds. Such a delayed surge in luminescence hinders their use in detection systems because this limits the reliability of detection and the read-out speed. However, one may compensate for this slow build-up and decay by adjusting the excitation mode and luminescence kinetics with the time functions of the detection system and of the evaluating electronics. This is possible using the compositions and methods of the present invention.

The relationships between the saturation intensity and the increase and decrease times can be varied within a wide range. Thus, it is possible to ensure that the composition exhibits low increase times and/or decrease times, which are required for realizing high-speed detection. For this purpose, the concentrations of the absorber and/or of the emitter of the electromagnetic radiation are adjusted so that the interactions between these ions leads to a proportionate quenching of the anti-Stokes luminescence (concentration quenching). For example, the concentrations of Yb and Tm for high read-out speeds are selected within the following limits:

$$(Gd_{(1-x-y)})_2O_2S:Yb_xTm_y$$

wherein $0.05 \leq x \leq 0.80$ and $0.0001 \leq y \leq 0.10$.

In a preferred embodiment, in order to achieve read-out speeds of up to 10 m/s, and preferably, between 3 and 6 m/s, x and y are chosen according to the following parameters: $0.20 \leq x \leq 0.60$ and $0.0001 \leq y \leq 0.05$. Because it has been found that the ratio of the intensities of the emission lines of the emission spectrum and of the build-up and decay behavior are affected by the concentration of the absorber and/or emitter, the composition and therefore, the secured document can be identified with even greater certainty using a combined detection system, wherein these mutually dependent properties are adjusted. In a preferred embodiment, the antiStokes luminophore is detected by a pulsed laser.

The selective incorporation of other cations and/or anions in the lattice or matrix of the compositions of the invention provides additional methods for influencing the increase and decrease characteristics of the composition. Additional cations and/or anions in the lattice will decrease the steady-state anti-Stokes luminescence insignificantly, whereas the increase and decrease times are clearly reduced.

In addition, selectively influencing the increase and decrease behavior and the relationship of the intensities of the emission lines by the concentration of the absorber and/or of the emitter and by incorporating additional anions and/or cations in the lattice of the fluorescent material, as indicated above for the case of the $(Gd_{(1-x-y)})_2O_2S:Yb_xTm_y$, can also be carried out for other anti-Stokes fluorescent substances.

In a preferred embodiment, the compositions of the invention are incorporated into authentication elements that are applied directly to the surface of the secured document during the printing process. This may be done by any suitable printing process, including without limitation, flat-bed printing, gravure, letterpress and screen printing processes, and more offset, half-tone intaglio, die stamping gravure printing, indirect letterset printing, non-impact printing techniques and digital printing methods.

The secured documents of the present invention have the advantage that the authenticity of such documents can be verified mechanically. Moreover, using the compositions and methods of the invention, one may verify the authenticity of secured documents at relatively high speeds, which permits the verification of a large number of secured documents within a short time.

It is preferable to select a small particle size for the composition of the invention in order to ensure better miscibility with the other components of the secured documents. Preferably, the compositions of the invention take the form of small, inorganic particles smaller than 5 µm, preferably smaller than 3 µm and optionally smaller than 2 µm. In addition, the excitation of the compositions of the invention by an extremely narrow-band light source (for example, that produced by an IR-emitting laser with specifically selected wavelengths may be enhanced by additional fluorescent materials or phosphor powders in the composition.

Such added materials may facilitate emission of light in the visible spectrum, thereby enabling the verification of secured documents by the unaided human eye. The compositions of the invention are preferably added to or mixed with suitable dyes or pigments before application to a secured document.

In an alternative embodiment, excitation by IR radiation with a suitable wavelength for materials with a specific IR absorption and emission in the visible range is also contemplated. OVI® pigments and optically variable pigments or liquid crystals can be used in addition to or mixed with the compositions of the invention.

In a preferred embodiment, the compositions of the invention are incorporated into authentication elements that take the form of a graphical display on the secured document, preferably in individual points and lines. In addition, transparent colors can be applied over, under and adjacent to the composition and differently colored fluorescent effects can be achieved by these means.

Any printing motif or graphical design can be produced using the compositions of the invention, wherein the composition is incorporated into at least one of printing inks in the form of small inorganic particles. For this purpose, it is preferable to use a degree of filling of 1 to 30% by weight, more preferably 1 to 20% by weight, and optionally 5 to 10% by weight, so that the graphic and, in particular, the color configuration is not affected.

In a preferred embodiment, the compositions of the invention are mixed with or incorporated into a printing dye or pigment to form the authentication element, which is applied to the surface of a secured document by any suitable method, including without limitation, brushing, coating, spraying, centrifuging, dipping, laminating, extruding and surface coating.

Alternatively, the compositions and authentication elements of the invention may be applied to a secured document in the form of an adhesive coating or a (surface) lacquer coating. Such a coating may also be covered by at least one further coating. In this connection, it is important that any additional coatings are transparent to the excitation of electromagnetic radiation and for the emission of electromagnetic radiation. For this purpose, coatings which have a broad-band transparency are particularly well suited. In a further examples, sheets can also be used which are transparent only to electromagnetic radiation in certain, specified wavelength regions.

The packing density, that is, the surface coverage of the anti-Stokes luminophores, should be selected in order to ensure that there is at least one anti-Stokes composition in an area the size of the measurement window of the detection device, wherein the surface coverage is determined substantially by the printing method and the printed motif. To achieve an excitation density necessary for a high speed detection, a high degree of surface coverage and a comparatively thick layer are advantageous. In this connection, the surface coverage comprises the two-dimensional degree of surface coverage and the three-dimensional thickness of the layer of printing ink, the lacquer or the coating. The surface coverage required for the laser detection cannot necessarily be compensated by increasing the pigment concentration in the printing ink. When anti-Stokes luminophores are added to a printing ink, it is important that the components of the printing ink do not significantly adsorb the electromagnetic radiation emitted and subsequently the electromagnetic radiation, which is to be detected. If, for example, visible radiation is to be detected, printing ink components which significantly adsorb visible radiation in the wavelength region of interest must be contained.

In a further embodiment of the invention, there is an empirical relationship between the signal emitted and the pigmented ink. Given otherwise identical parameters, such as pigment concentration in the printing ink, motif, area coverage, printing method and printing press, the signal emitted increases in the following sequence: cyan>magenta>yellows>clear. In an additional embodiment, the composition is added to a secured document as inorganic particles, particularly in the case of postage stamps, in the adhesive coating or the gummed glue adhered to the document and can be excited by means of laser beam excitation through the paper substrate. In this embodiment, the anti-Stokes emission can be verified through the paper substrate.

Printing compositions comprising inks or pigments and the anti-Stokes luminophores of the invention are also contemplated by the present invention. Such compositions are prepared as a paste by mixing the anti-Stokes luminophores and varnishes, which are matched to the printing process. In three-roller mills, this paste, together with the remaining components of the printing compositions, such as pigments, additives, auxiliary materials, etc. are then processed into the printing composition (for, e.g., flat bed printing, letterpress, printing and gravure printing). Optionally, the pigment can also be incorporated directly into the printing composition by homogenization in the roller mill. For preparing half-tone image printing inks, the components of the printing ink as well as the security pigment are homogenized in ball mills.

For the preparation of paper glue or lacquer, pigments may be incorporated as additional additives during the appropriate steps of the process, for example, cellulose pulp processes for papers doped with the compositions of the invention).

The present invention is not to be limited in scope by the specific embodiments described herein. Indeed, various modifications of the invention in addition to those described herein will become apparent to those skilled in the art from the foregoing description and any accompanying figures. Such modifications are intended to fall within the scope of the appended claims.

Patents, patent applications, publications, procedures, and the like are cited throughout this application, the disclosures of which are incorporated herein by reference in their entireties.

What is claimed is:

1. A secured document comprising a composition capable of anti-Stokes fluorescence comprising
  (a) a gadolinium oxysulfide selected from the group consisting of
    (1) a composition of the formula $(Gd_{(1-x-y)}Yb_xTm_y)_2O_2S$; and
    (2) a composition of the formula $(Gd_{(1-x-y)2}O_2S:Yb_xTm_y$, wherein x and y are numbers greater than 0,
wherein the wavelength of the emitted electromagnetic radiation is shorter than the wavelength of the absorbed electromagnetic radiation, and wherein the concentrations of Yb and Tm are adjusted to achieve concentration quenching of anti-Stokes luminescence.

2. The secured document of claim 1, wherein the composition has the formula
  $(Gd_{(1-x-y)})_2O_2S:Yb_xTm_y$, wherein x is $0.05 \leq x \leq 0.80$ and y is $0.0001 \leq y \leq 0.10$.

3. The secured document of claim 2, wherein x is $0.20 \leq x \leq 0.60$ and y is $0.0001 \leq y \leq 0.05$, and the composition provides a read-out speed of between about 3 and about 6 m/s.

4. The secured document of claim 1, wherein said composition is incorporated into an authentication element comprising a pigment.

5. The secured document of claim 4, wherein the authentication element has a particle size less than 5 μm.

6. The secured document of claim 5, wherein the authentication element has a particle size less than 3 μm.

7. The secured document of claim 6, wherein the authentication element has a particle size less than 2 μm.

8. The secured document of claim 4, wherein the authentication element is applied to the secured document by a method selected from the group consisting of offset printing, half-tone intaglio printing, die stamping gravure printing, and digital printing.

9. The secured document of claim 4, wherein the authentication element further comprises a printing ink or pigment and a degree of filling is within the range of 1 to 30 percent by weight.

10. The secured document of claim 9, wherein the degree of filling is in the range of 1 to 20 percent by weight.

11. The secured document of claim 9, wherein the degree of filling is in the range of 5 to 10 percent by weight.

12. The secured document of claim 4, wherein the authentication element is applied to the document by a method selected from the group consisting of brushing, coating, and surface-coating.

13. The secured document of claim 4, wherein the authentication element further comprises an adhesive element.

14. The secured document of claim 1, further comprising a matrix composition comprising yttrium, lanthanum, and thulium.

15. The secured document of claim 1, further comprising a matrix composition comprising yttrium, lanthanum, or thulium.

* * * * *